United States Patent [19]
Brown, Jr.

[11] 3,879,452
[45] Apr. 22, 1975

[54] METHOD FOR MAKING DIGLYCOLIC ACID, DIPROPIONIC ACID AND THE SALTS THEREOF

[75] Inventor: George E. Brown, Jr., Cincinnati, Ohio

[73] Assignee: Conen Corporation, Cincinnati, Ohio

[22] Filed: June 18, 1971

[21] Appl. No.: 154,584

Related U.S. Application Data

[63] Continuation-in-part of Ser. No. 141,203, May 7, 1971, abandoned, which is a continuation-in-part of Ser. No. 79,690, Oct. 9, 1970, abandoned.

[52] U.S. Cl............................ 260/531 R; 260/535 P
[51] Int. Cl....................... C07c 51/30; C07c 59/12
[58] Field of Search .......... 260/535 P, 531 R, 456.6

[56] References Cited
UNITED STATES PATENTS

| 2,659,754 | 11/1953 | Ash et al. ........................ 260/535 P |
| 2,837,567 | 6/1958 | Taylor ............................ 260/535 P |
| 3,342,858 | 9/1967 | Fuhrmann et al. ............... 260/535 P |

FOREIGN PATENTS OR APPLICATIONS
4,223,327  11/1967  Japan .............................. 260/535 P OTHER PUBLICATIONS
Noller, Chem. of Org. Cmpds. (1965) p. 181.

*Primary Examiner*—Lorraine A. Weinberger
*Assistant Examiner*—Richard D. Kelly

[57] ABSTRACT

Disclosed herein are improved methods for making diglycolic acid, dipropionic acid and the salts thereof. The methods include the use of diethylene glycol, dipropylene glycol, or chloroacetic acid as starting materials. In the preferred method for manufacturing diglycolic acid, diethylene glycol is oxidized under controlled temperature conditions and in the presence of a minor amount of water. Ozone is the preferred oxidizing agent. In one method for manufacturing dipropionic acid, dipropylene glycol is oxidized while in the other process diethylene glycol is reacted with hydrogen cyanide and the resulting nitrile is reacted with sodium hydroxide.

2 Claims, 1 Drawing Figure

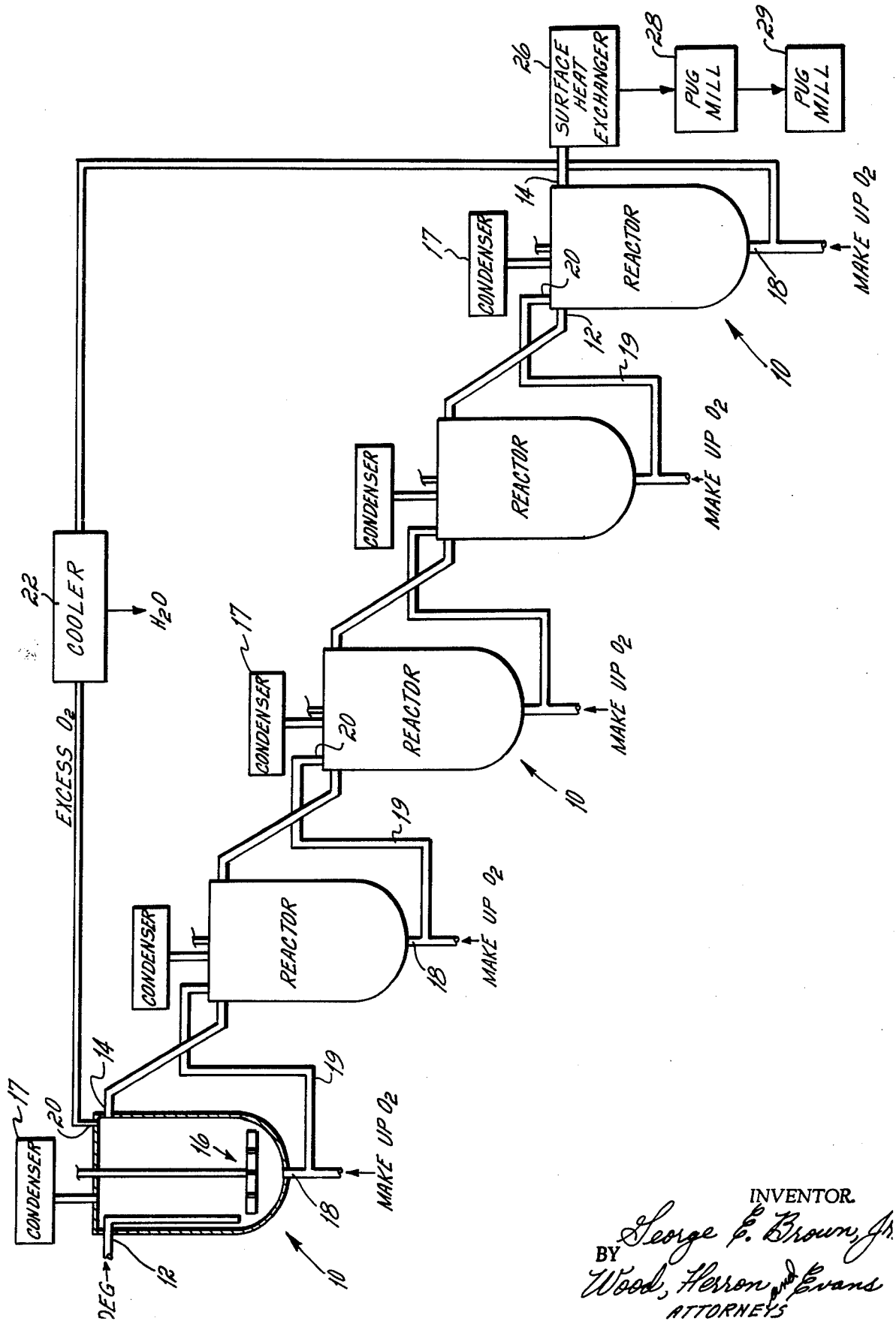

METHOD FOR MAKING DIGLYCOLIC ACID, DIPROPIONIC ACID AND THE SALTS THEREOF

CROSS REFERENCE TO RELATED APPLICATION

This application is a continuation-in-part of U.S. application Ser. No. 141,203 filed May 7, 1971, which in turn was a continuation-in-part of U.S. application Ser. No. 79,690 filed Oct. 9, 1970, both now abandoned.

BACKGROUND OF THE INVENTION AND THE PRIOR ART

In signing the National Environmental Policy Act on January 1, 1970 President Nixon declared that America must reclaim the purity of its air and water. In furtherance of our government's objectives of eliminating pollution a Presidential Commission was appointed to study the causes of pollution and to recommend solutions thereto. On Aug. 10, 1970 their initial report was made public. It included as one recommendation for reclaiming our waters that "polyphosphate builders" be eliminated from detergent compositions.

For a number of years now, the polyphosphates and especially sodium tripolyphosphate (STP) and tetrasodium pyrophosphate (TSPP) have been the backbone of detergent compositions. The role of these builders is a complex one but two of their principal, required functions are to sequester calcium and magnesium salts in the wash water and to enhance the cleaning capabilities of detergent compounds.

Millions of tons of the polyphosphates are sold annually in the United States for use as builders. Sometime during the life span of these detergents they are usually discharged into our nation's lakes and streams.

In recent years a growing amount of evidence has indicated that the polyphosphates have deleterious effects on our streams and lakes. For example, it has been observed that the growth of certain algae in bodies of water is stimulated by the polyphosphates, thus causing serious damage to various kinds of aquatic plants and fish. The algae buildup also produces a very unpleasant sight. And, before too long, conventional water sports are no longer possible.

Prior to the Environmental Act of 1970, one of the largest concerted industrial efforts was instituted to discover a satisfactory, nonpolluting replacement for the polyphosphates in detergent compositions. It is still being actively pursued. Recently, one major seller of cleaning products advertised that it had, without success, spent over three million dollars in an effort to discover such a replacement. Despite this concerted effort, no such replacement has been announced by anyone.

Other builder detergent salts are known or have been announced. Some supposedly present no pollution problems. While they are thus superior to the polyphosphates in that respect they are inferior in other ways. For example, some have been too costly to manufacture, others have failed to function properly as builders, to display the required synergistic action in combination with detergent compounds, and still others have become suspect of producing undesirable side effects.

One builder salt which some detergent manufacturers have recently begun commercially using is the trisodium salt of nitrilotriacetic acid. While the use of this salt has reduced the amounts of polyphosphates required in a particular detergent composition, it has not eliminated the polyphosphates entirely. In such compositions polyphosphates are still employed. Moreover, in recent months some opinions have been expressed that this compound may contribute to the growth of, or cause cancer.

Builder salts other than the alkali metal salts of the aminopolycarboxylic acids have been proposed as polyphosphate replacements. For instance, in Diehl U.S. Pat. No. 3,308,067, a polyphosphate substitute is disclosed. The inventor describes his builder salts as being water soluble salts of polymeric aliphatic polycarboxylic acids. He describes the "essential" structural characteristics of such salts as follows:

1. A minimum molecular weight of about 350 calculated as the acid form.
2. An equivalent weight of about 50 to about 80 calculated as the acid form.
3. At least 45 mole percent of the monomeric species comprising the polymer aliphatic polycarboxylic acid species having at least two carboxyl radicals separated from each other by not more than two carbon atoms.
4. And, the site of attachment to the polymer chain of any carboxyl-containing radical being separated by not more than three carbon atoms along the polymer chain from the site of attachment of the next carboxyl-containing radical.

He points out later in the patent that as the molecular weight decreases below 350, the builder properties decrease substantially.

Still other builder salts have been produced as polyphosphate replacements namely, sodium phytate, the water soluble salts of methylene diphosphoric acid, etc. A review of such salts and the patents disclosing them is contained in U.S. Pat. No. 3,346,873.

Despite the millions of dollars which have been spent in an attempt to discover polyphosphate replacements there has been no compound discovered which favorably compares with the polyphosphates on a price and performance basis and which eliminates the pollution problem. To these ends this invention is directed.

It has been empirically discovered that the alkali metal salts or ammonium salts of 2, 2 oxydiacetic acid (sometimes called diglycolic acid) and oxydipropionic acid may be used to replace conventional builder salts in detergent compositions. The salts of these oxydialkonic acids function as well as the polyphosphates in detergent compositions. In combination with detergent compounds the required synergistic characteristics are exhibited. Unlike the polyphosphates they do not create any water pollution problems. They do not stimulate algae growth. Such detergent compositions are more fully discussed in pending application Ser. No. 79,690. The preferred builder salt referred to in said application is disodium diglycollate (referred to hereafter as DSDG). While performance of the builder salt is certainly one important criteria, another is cost of manufacture. The domestic market for builder salts exceeds two billion pounds annually. Therefore, seemingly small differences in costs become very significant. In order to compare with the phosphates on a price basis, the salts of the foregoing described oxydialkonic acids must be able to be produced from low cost raw materials. Also, the method employed: (1) must utilize low cost equipment, (2) must be a continuous process, (3) must be a substantially dry process so that extensive drying steps are eliminated, (4) must be an automated method, and (5) must comprise only a few manufacturing operations.

To the above objectives this invention is directed.

SUMMARY OF THE INVENTION

It has been empirically discovered that the foregoing objectives may be fulfilled by making DSDG by a process wherein diethylene glycol (sometimes referred to as dihydroxy-diethyl ether), $HOCH_2$ $CH_2O$ $CH_2CH_2OH$, is oxidized to diglycolic acid, and the diglycolic acid is converted to its disodium salt.

In one method of this invention: (1) the diethylene glycol (DEG) is oxidized in the presence of a minor amount of water and preferably in the presence of an oxidation catalyst, and (2) at a temperature of about 80° to 150°C. Thereafter the diglycolic acid is converted to its disodium salt by: (1) first forming the monosodium salt and (2) second forming the disodium salt from the monosodium salt. In the preferred method ozone is used as the oxidizing agent and no catalyst is employed.

The above process is adapted to be practiced on a continuous basis and is especially suited to producing commercial quantities of DSDG. Moreover, the process can produce DSDG at a cost comparable to the phosphates and NTA, thus making DSDG an equal in price as well as performance.

In the above described process conventional equipment may be employed. It is believed that existing facilities, formerly used to manufacture NTA may be easily converted to producing DSDG according to the foregoing method.

It will be noted also that the foregoing process: (1) utilizes low cost raw materials, (2) includes a minimum of process steps, (3) does not include complicated steps, and (4) insures that undesirable by-products are not produced. As to the latter feature, it has been discovered that ester formation from the alcohol and acid present is eliminated by the minor amount of water added during the oxidation reaction. Therefore, this step is an important feature of this invention.

The economics of scale present in the foregoing process are enjoyed partly be reason of the utilization of the differences in solubility in water displayed by diglycolic acid, its monosodium salt, and its disodium salt. For example, the amount of water present during the DEG oxidation reaction and the temperature of the reaction are regulated so that the diglycolic acid produced is maintained in solution. The preferred conversion of the diglycolic acid to its disodium salt also takes advantage of the solubility differences of the monosodium salt and the disodium salt.

In the conversion of the acid to the double salt the heat generated during the neutralization reaction is used to eliminate water. By first forming the monosodium slat and thereafter the disodium salt the heat generated is more easily controlled and efficiently utilized. The utilization of this heat helps to reduce the cost or producing this builder salt.

PREFERRED EMBODIMENTS OF THE INVENTION

Oxidation of DEG — Example 1

In carrying out the oxidation of the DEG to diglycolic acid and its conversion to the desired salt many different types of equipment can be utilized. However, to accomplish the foregoing objectives it will be recognized that certain types of equipment are preferred. The equipment chosen should be capable of being operated such that the process is carried out on a continuous basis.

The FIGURE shows schematically one system which may be employed in the practice of my process. Referring to this FIGURE, the practice of the process will now be explained.

A plurality of oxidation reactors 10 linked together in cascade form, provide a series of reaction chambers in which the oxidation reaction may be carried out. An especially useful reactor is a jacketed agitated reactor with a condenser manufactured by the Parry Equipment Company of Camden, N.J. It will be understood by those skilled in the art that there are a number of other suitable reactors currently being manufactured and sold.

Each oxidation reactor contains an inlet 12 for receiving the DEG and each reactor contains a DEG outlet 14. Each reactor is equipped with suitable agitating means, generally referred to by the number 16. Above each reactor is a condenser 17 whose purpose is for condensing water and DEG and returning them to the reactor.

In the practice of the process DEG and about 3 to 5 percent by weight of water are charged to the first reactor 10 in the series through the inlet 12 and the reactor is allowed to fill up until the DEG and water mixture flows through the outlet 14 and into the second reactor which in turn fills up and overflows into the next reactor. This procedure is continued until the reactors are all substantially filled with the DEG and water mixture. While it is not required, the oxidation reaction is preferably carried out in the presence of about ½ to 2 percent by weight of cuprous acetate. This material serves as an oxidation catalyst.

Next the reactors are heated by any suitable means so that the DEG and water mixture is heated to a temperature of between 80° C. and about 150° C. The agitating means are started so that the DEG and water mixture is continuously agitated.

The lowermost reactor in the chain of reactors contains an oxygen inlet 18 and an oxygen outlet 20. Each of the other reactors also contains oxygen inlet means 18 and outlet means 20. Suitable piping 19 connects the oxygen outlet 20 of the lowermost reactor with the oxygen inlet 18 of the next reactor and so forth up through the chain of reactors. The uppermost reactor has an oxygen outlet 20 which is connected to a cooler 22 of any conventional design. This cooler serves the function of removing water and oxygen. Any oxygen is returned to the lowermost reactor and re-enters that reactor. As desired make up oxygen may be added to one or more of the reactors at the inlet 18.

After the reactors are filled with the DEG and water and are heated so that the mixture is at a temperature of between 80° and 150° C., oxygen is passed through the reactors. The source of the oxygen is not shown. It is to be understood of course, that air and/or pure oxygen may be employed.

During the oxidation reaction the concentration of the water must be maintained at 3 to 5 percent by weight of the total mixture. This insures that an ester of the DEG and diglycolic acid is not formed. If the percentage of water is allowed to fall below about 3 percent by weight such a reaction can occur and an undesirable by-product is formed.

The oxidation reaction is allowed to continue until the DEG has been completely oxidized to diglycolic acid. A convenient method for determining when the oxidation reaction reaches completion is to take a sample of the liquid from the reactors and add ceric ammonium nitrate to it. If there is DEG still present, the sample will turn red. If the oxidation reaction is complete and only diglycolic acid is present, the sample remains yellow. This test can be used to determine quantitatively by colorimetric measurement how much of the DEG has been converted into diglycolic acid.

After the oxidation reaction is completed the diglycolic acid and water mixture is removed from the lower reactor through the outlet 14. Those skilled in the art will recognize that the foregoing system can be operated on a continuous operation after the oxidation reaction has begun.

The intake of DEG into the reactors and the exhaust of the diglycolic acid system may be balanced so that diglycolic acid is continuously removed through the outlet 14.

Diglycolic acid at room temperature is a solid crystalline material. At a temperature of 80° C. or higher it is soluble in water in very high concentration. Therefore, in the process the mixture of water and diglycolic acid is maintained at a temperature of 80° C. or above so that the mixture exists in liquid form. As the mixture is withdrawn from outlet 14 it is maintained at 80° C. or above. The amount of water at this point may be regulated through the condensing means so that about 9 percent or more is present.

After the diglycolic-water mixture leaves the lowermost reactor through the outlet 14 it is passed to a wiped surface heat exchanger 26 and cooled to below about 30° C. The wiped surface heat exchanger 26 is of conventional design, its function being to cool the mixture. As the mixture is cooled to below about 30° C. a slush of diglycolic acid crystals and water is produced. The wiped surface heat exchanger 26 also includes means, not shown, for insuring that the acid crystals are not allowed to build up on the inner surface of the exchanger.

Oxidation of DEG — Example No. 2

Ozone may be used in place of the $O_2$ and oxidation catalyst used in Example No. 1.

The use of ozone has several advantages to wit, the oxidation reaction is faster, and the plurality of reactors preferred for use in Example No. 1 may be reduced.

Ozone, which is a high-energy allotropic form of the element oxygen is available in commercial quantities. It is customarily manufactured by passing gaseous oxygen or air through a high-voltage, alternating current electric discharge, frequently referred to as a silent discharge. The manner in which it is prepared however, forms no part of the present invention.

In place of the plurality of reactors 10 linked together in cascade form, one reactor is used, identical to the one previously described. Of course, if desired, a plurality of reactors could be employed.

In all other respects the process steps involved are identical to the ones previously described except that the catalyst and $O_2$ are not employed and that it is necessary to control the temperature of the reaction as there is a tendency for overheating to be encountered.

After formation, the diglycolic acid and water mixture is cooled as previously described.

In the preferred practice of the process the mixture of diglycolic acid crystals and water is conveyed to a pug mill or double arm paddle blade mixer designated generally by the numeral 28. Such a pug mill is of conventional design well known to those skilled in the art. Into the pug mill 28 is added a quantity of sodium carbonate or sodium hydroxide. The amount to be added is dependent upon the amount of diglycolic acid which is added to the pug mill. The amount of sodium carbonate or sodium hydroxide added is enough to produce the monosodium salt of diglycolic acid. That is, about ½M of sodium carbonate or 1M of sodium hydroxide is added for each mole of diglycolic acid. The remaining water and the monosodium salt of diglycolic acid are conveyed to another pug mill 29 wherein a sufficient amount of sodium hydroxide or sodium carbonate is added so that the disodium salt of the diglycolic acid is produced.

It will be appreciated that the heat necessary to distill the water during the mono-salt formation step and the di-salt formation step in the pug mill is supplied by the heat evolved during the reaction of the sodium carbonate or sodium hydroxide with the diglycolic acid. The carbon dioxide evolved during this reaction also helps to remove the water vapor. This is about 1M or more of the sodium compound. The product remaining is the disodium salt of diglycolic acid. At this point in the process the material is in a state of sufficient dryness so that it can be stored, shipped, etc. If desired heat can be added to the pug mill to aid in the removal of water.

To produce the sodium salt sodium carbonate rather than sodium hydroxide is preferred because during the reaction with sodium carbonate only one mole of water is formed whereas during the reaction with sodium hydroxide two moles of water are formed.

If desired the formation of salt may be effected in one pug mill but it has been found preferable to utilize two pug mills. The monosodium salt of diglycolic acid is much less soluble in water than the disodium salt. Therefore, water present after the monosodium salt is formed is more easily removed at this point than after the formation of the disodium salt. This is still another feature of the process which enables the final product to be cheaply manufactured.

Those skilled in the art will recognize that the reactant materials may be added in varying amounts. For example, into the reactor(s) should be charged about 106 parts by weight of DEG and about 6 parts by weight of water. About 64 parts by weight of oxygen are then reacted with the DEG until complete oxidation is effected. To the 134 parts by weight of DEG and 42 parts by weight of water so prepared are added 18 parts by weight of water and 53 parts by weight of sodium carbonate. The resulting monosodium salt is converted to the disodium salt by the addition of another 53 parts of weight of sodium carbonate.

In an alternative process the mixture of diglycolic acid and water after removal from the wiped surface heat exchanger 26 is centrifuged to remove the water. Thereafter the diglycolic acid is converted to its disodium salt by adding the required amount of sodium carbonate or sodium hydroxide. This is conveniently done in a pug mill wherein the water produced is removed through the heat of neutralization.

While the foregoing process has been described in terms of manufacturing the disodium salt of diglycolic acid, the disodium salt of dipropionic acid is prepared in a similar manner. In such a process dipropylene glycol is used instead of DEG and is oxidized to form dipropionic acid. This in turn is converted to its disodium salt by the addition of sodium carbonate or sodium hydroxide. The other alkali metal salts or the ammonium salts of the oxydialkonic acids may also be prepared in a similar manner by substituting the proper carbonate or hydroxide in place of the sodium carbonate and sodium hydroxide.

It has also been discovered that the disodium salt of dipropionic acid may be prepared also from DEG. This process is believed to be more commercially practical from a cost standpoint than the process described above wherein dipropylene glycol is used.

In order to manufacture dipropionic acid from DEG the DEG is reacted with HCN at a temperature of about 150° C. and a pressure of about 35–40 psig. The reaction may be effected in an agitated pressure reactor. In the reaction two moles of HCN are reacted with one mole of DEG. The resulting products are one mole of 3, 3 oxy-dipropionitrile and two moles of water. To this mixture is added two moles of sodium hydroxide and about 5 percent by weight of water. Heat is applied to bring the temperature of the mixture to 95° C. During the reaction ammonia gas is given off and the reactor must, therefore, be vented. The resulting material is the disodium salt of dipropionic acid, i.e. disodium 3, 3 oxy-dipropionate. The resulting mixture is dried and thereafter ready for use as a builder salt in detergent compositions.

As mentioned previously, it is believed that the foregoing process for manufacturing dipropionic acid and its disodium salt is the preferred method from a commercial standpoint. It is believed that through the use of this process the dipropionic acid salt may be manufactured and sold at a cost which is competitive to or even lower than the cost for the phosphates and NTA. Moreover, it will be recognized by those skilled in the art that the chemical reactions involved are relatively simple and that expensive equipment is not needed. Those skilled in the art will also recognize that the ammonia gas may be recovered and HCN prepared therefrom. Those skilled in the art will also recognize that no undesirable by-products are formed during the reactions.

While any source of diethylene glycol may be utilized it has been found that an especially useful process for manufacturing it is one wherein ethylene oxide is used as one of the raw materials. For example, ethylene oxide and hydrogen chloride gas are first reacted to form ethylene chlorohydrin. Lime is then added to the ethylene chlorohydrin. The resultant products are calcium chloride and diethylene glycol. The diethylene glycol is separated from the calcium chloride by distillation under reduced pressure.

This process for making the DEG has several advantages over existing processes. One is the elimination of any undesirable by-products which would contaminate the desired end products. Another advantage is that no undesirable isomers are formed. Another especially suitable process for making diglycolic acid consists of reacting a molar excess of chloroacetic acid with calcined calcium oxide. An excess of the acid is used so that calcium chloride instead of the calcium salt of the chloroacetic acid is formed. By excess is meant 0.1M or more. The excess chloroacetic acid is neutralized, as for example with $Na_2CO_3$. The calcium chloride may be separated from the diglycolic acid as for example by centrifuging. It is important that water not be present during the reaction since calcium chloride is easily hydrolyzable. Under such a condition the calcium ions would then be chelated by the diglycolic acid and the subsequent reaction to form the sodium salt would be hindered or prevented.

Having thus described my invention, I claim:

1. A method for manufacturing diglycolic acid which comprises oxidizing diethylene glycol with oxygen or air in the presence of about 3 to 5 percent by weight of water, at a temperature of about 80° to 150° C., and in the presence of about ½ to 2 percent by weight of cuprous acetate.

2. A method for manufacturing dipropionic acid which comprises oxidizing dipropylene glycol with oxygen or air in the presence of about 3 to 5 percent by weight of water, at a temperature of about 80° to 150° C., and in the presence of about ½ to 2 percent by weight of cuprous acetate.

* * * * *